(12) United States Patent
Kanamori

(10) Patent No.: US 11,595,544 B1
(45) Date of Patent: Feb. 28, 2023

(54) IMAGE FORMING APPARATUS

(71) Applicant: TOSHIBA TEC KABUSHIKI KAISHA, Tokyo (JP)

(72) Inventor: Keiko Kanamori, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/668,408

(22) Filed: Feb. 10, 2022

(51) Int. Cl.
*H04N 1/32* (2006.01)
*H04N 1/00* (2006.01)

(52) U.S. Cl.
CPC ..... *H04N 1/32149* (2013.01); *H04N 1/00037* (2013.01); *H04N 2201/0094* (2013.01)

(58) Field of Classification Search
CPC ........... G06T 9/00; G06T 15/10; G06T 15/08; G06T 2207/10052; G06T 3/4007; G06T 3/4038; G06T 3/4053; G06T 7/50; G06T 7/596; G06T 7/60; G06T 9/20; A61B 1/00009; A61B 1/00193; A61B 1/00194; G02B 30/23; G02B 30/24; G02B 30/25; G06F 3/01; G06K 19/06; G06K 19/06037; G06K 7/1408; G06K 7/1443; G06V 10/56; G06V 10/20; H04L 65/61; H04L 65/611; H04L 65/70; H04L 65/762; H04B 1/40

See application file for complete search history.

(56) References Cited

U.S. PATENT DOCUMENTS

| 5,247,371 | A | | 9/1993 | Hikawa et al. | |
|---|---|---|---|---|---|
| 5,917,947 | A | * | 6/1999 | Ishida | H04N 19/60 382/232 |
| 6,661,933 | B1 | * | 12/2003 | Hisatomi | H04N 1/00708 382/209 |
| 7,126,598 | B2 | * | 10/2006 | Oh | H04N 13/111 345/422 |
| 8,139,237 | B2 | * | 3/2012 | Onishi | G06T 5/50 358/1.9 |
| 8,311,361 | B2 | * | 11/2012 | Chen | G06T 5/009 382/274 |

(Continued)

FOREIGN PATENT DOCUMENTS

| JP | 1-220962 | 9/1989 |
|---|---|---|
| JP | 2-231694 | 9/1990 |

(Continued)

*Primary Examiner* — Negussie Worku
(74) *Attorney, Agent, or Firm* — Amin, Turocy & Watson, LLP

(57) ABSTRACT

If an image read by an image reading unit is formed by an image forming unit, a control unit synthesizes a first encoded image and a second encoded image with the image formed by the image forming unit to generate a synthetic image, the first encoded image representing encoded data where reading setting information used for the image reading unit to read the image is encoded, the second encoded image representing encoded data where forming setting information used for the image forming unit to form the image is encoded, the first encoded image being synthesized at a position where a direction in which the document is read by the image reading unit is specifiable, and the second encoded image being synthesized at a position where a direction in which the image is formed on the sheet is specifiable. The image forming unit forms the synthetic image on the sheet.

20 Claims, 14 Drawing Sheets

(56) References Cited

U.S. PATENT DOCUMENTS

| | | |
|---|---|---|
| 2004/0086043 A1* | 5/2004 | Ito .................. H04N 19/503 |
| | | 375/E7.263 |
| 2005/0206946 A1* | 9/2005 | Kato .................. H04N 1/41 |
| | | 358/1.15 |
| 2006/0126113 A1 | 6/2006 | Narazaki |
| 2007/0057987 A1 | 3/2007 | Miyamoto et al. |
| 2009/0033971 A1 | 2/2009 | Kawai |
| 2010/0201995 A1 | 8/2010 | Yoshida |
| 2016/0050334 A1* | 2/2016 | Hachiro .................. H04N 1/40 |
| | | 358/448 |
| 2017/0274691 A1 | 9/2017 | Nakahara |
| 2019/0196379 A1 | 6/2019 | Sugata |

FOREIGN PATENT DOCUMENTS

| | | |
|---|---|---|
| JP | 11-254793 | 9/1999 |
| JP | 2006-303920 | 11/2006 |
| JP | 2007-81936 | 3/2007 |
| JP | 2008-147954 | 6/2008 |
| JP | 2008-225377 | 9/2008 |
| JP | 2011-77620 | 4/2011 |
| JP | 2012-237874 | 12/2012 |

* cited by examiner

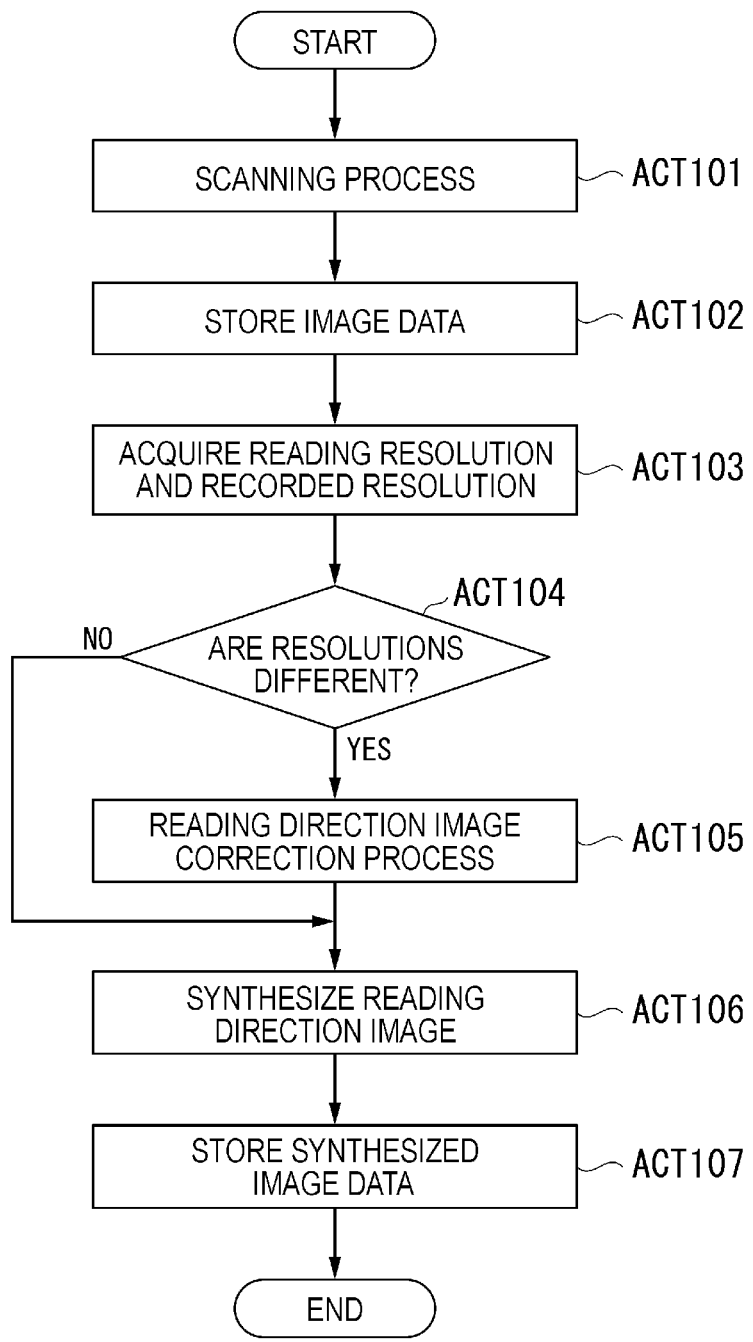

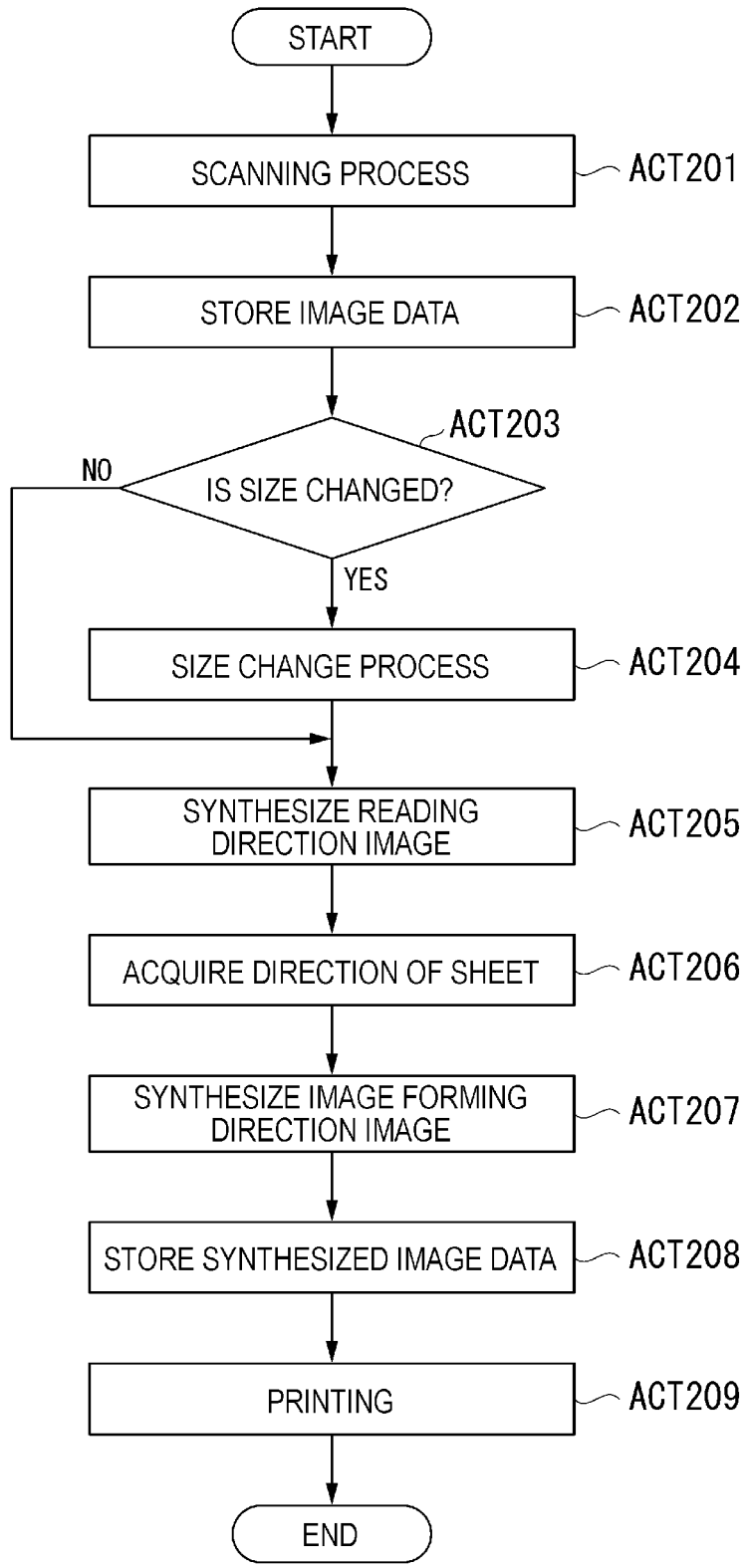

FIG. 16

| | VALUE | NUMBER OF DIGITS |
|---|---|---|
| READING UNIT INFORMATION | 0: DOCUMENT TRAY, 1: ADF | 1 |
| RESOLUTION INFORMATION | X(dpi)×Y(dpi) | 6 |
| READING MODE INFORMATION | 0: MONOCHROME, 1: GRAY SCALE, 2: FULL COLOR | 1 |
| SIZE INFORMATION | 0: A4 HORIZONTAL, 1: A4 VERTICAL, 2: A3, 3: B4 | 1 |

FIG. 17

| | VALUE | NUMBER OF DIGITS |
|---|---|---|
| ROTATION INFORMATION | 0: NOT ROTATED, 1: ROTATED | 1 |
| PRINTING MODE INFORMATION | 0: CHARACTER, 1: PICTURE | 1 |
| SIZE CHANGE INFORMATION | MAGNIFICATION: (25 to 400) | 3 |
| INTEGRATION INFORMATION | NUMBER OF PAGES INTEGRATED (1 to 8) | 1 |
| SIZE INFORMATION | 0: A4 HORIZONTAL, 1: A4 VERTICAL, 2: A3, 3: B4 | 1 |

FIG. 18

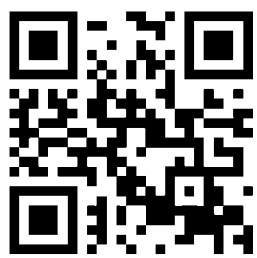

FIG. 19

IMAGE FORMING APPARATUS

FIELD

Embodiments described herein relate generally to an image forming apparatus.

BACKGROUND

In order to inspect or investigate an image forming apparatus, information representing a reading direction or a printing direction of a document may be required. In this case, for example, a service person may take out information or printed matter regarding the reading of a document to execute an inspection or an investigation based on the information or the printed matter.

However, if the information for the inspection or the investigation is missing or wrong, there is a problem in that, for example, the reason for the missing or wrong information cannot be specified. In this related art, it is difficult to easily acquire accurate information regarding the reading or printing of a document.

DESCRIPTION OF THE DRAWINGS

FIG. 14 is a flowchart illustrating the flow of a process of synthesizing a read image;

FIG. 15 is a flowchart illustrating the flow of a process of synthesizing the reading direction image and the image forming direction image during copying;

FIG. 16 is a diagram illustrating an example of reading setting information;

FIG. 17 is a diagram illustrating an example of forming setting information;

FIG. 18 is a diagram illustrating an example of a two-dimensional code;

FIG. 19 is a diagram illustrating an example of a barcode;

DETAILED DESCRIPTION

In general, according to one embodiment, an image forming apparatus includes an image reading unit, an image forming unit, and a control unit. The image reading unit is configured to read an image drawn on a document. The image forming unit is configured to form an image on a sheet. The control unit is configured to generate, if the image read by the image reading unit is formed by the image forming unit, a first encoded image and a second encoded image and to synthesize the first encoded image and the second encoded image with the image formed by the image forming unit to generate a synthetic image, the first encoded image being an image representing encoded data where reading setting information used for the image reading unit to read the image is encoded, the second encoded image being an image representing encoded data where forming setting information used for the image forming unit to form the image is encoded, the first encoded image being synthesized at a position where a direction in which the document is read by the image reading unit is specifiable, and the second encoded image being synthesized at a position where a direction in which the image is formed on the sheet is specifiable. The image forming unit forms the synthetic image on the sheet.

Hereinafter, the image forming apparatus according to the embodiment will be described with reference to the drawings.

Figure 1:
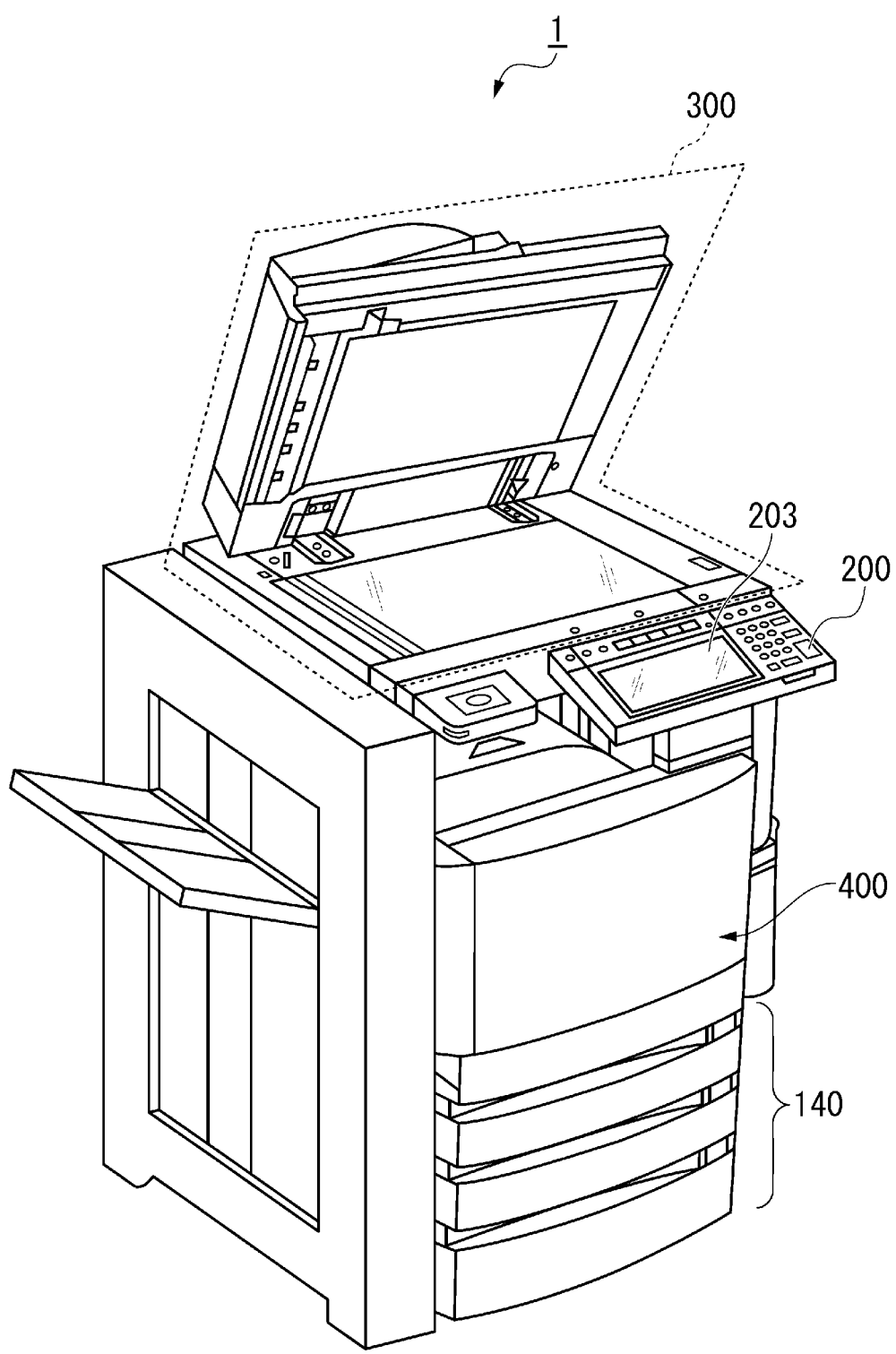
FIG. 1 is an appearance diagram illustrating an overall configuration example of an image forming apparatus according to an embodiment.
Figure 2:
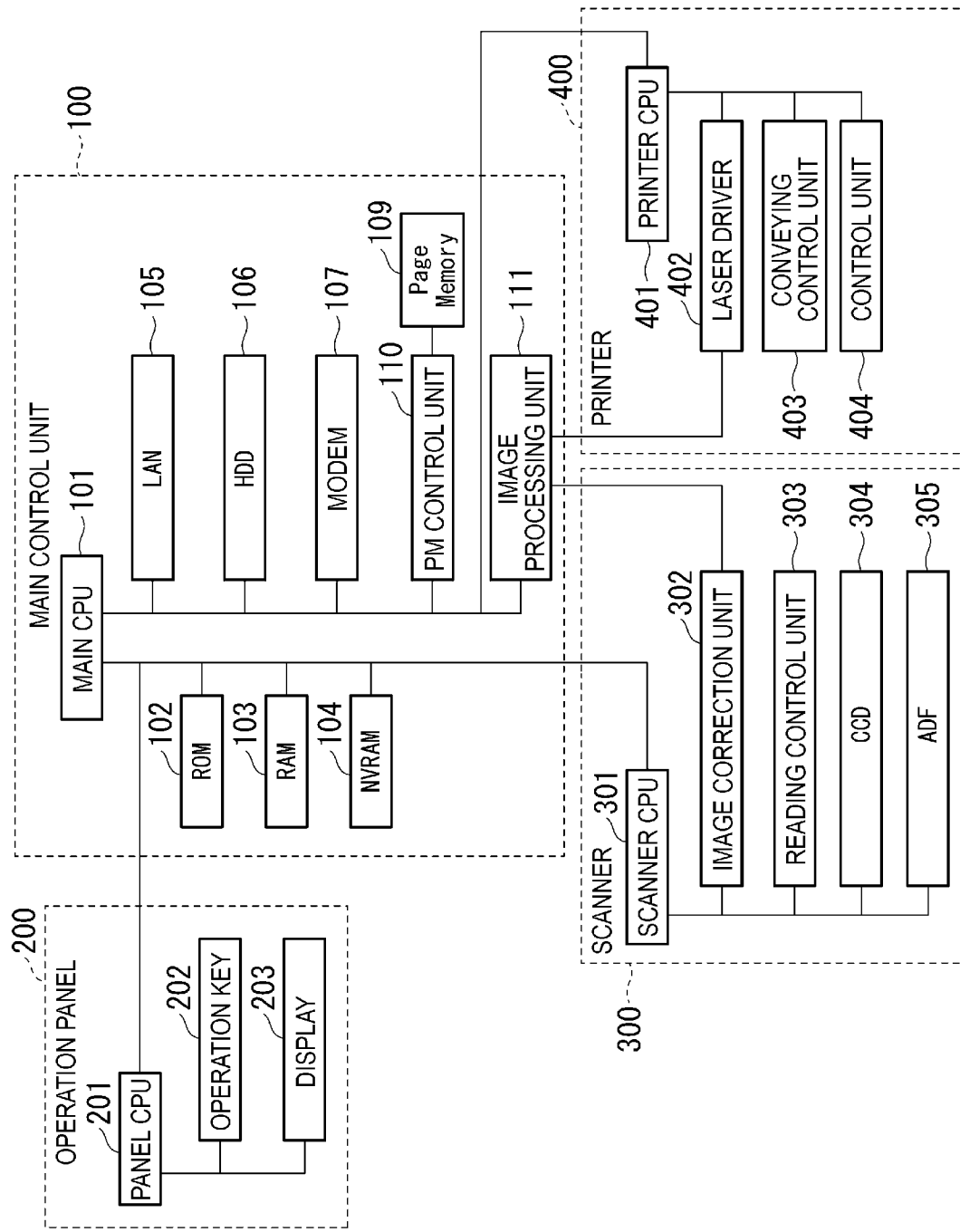
FIG. 2 is a hardware block diagram illustrating a hardware configuration of the image forming apparatus.

FIG. 1 is an appearance diagram illustrating an overall configuration example of an image forming apparatus 1 according to an embodiment. FIG. 2 is a hardware block diagram illustrating a hardware configuration of the image forming apparatus 1 according to the embodiment. First, the description will be made mainly using FIG. 1. The image forming apparatus 1 is, for example, a multi-function peripheral. The image forming apparatus 1 includes a main control unit 100, a sheet accommodation unit 140, an operation panel 200, a scanner 300, and a printer 400. The image forming apparatus 1 forms an image on a sheet with a developer. The developer is, for example, toner. In the following description, the toner is used as the developer. The sheet is, for example, paper or a label paper. The sheet may be any material as long as the image forming apparatus 1 can form an image on a surface of the sheet.

The operation panel 200 includes one or more operation keys 202 and a display 203. The operation panel 200 receives an operation of a user. The operation panel 200 outputs a signal corresponding to the operation executed by the user to the main control unit 100.

The display 203 is an image display device such as a liquid crystal display or an organic EL (Electro Luminescence) display. The display 203 displays various information regarding the image forming apparatus 1.

The printer 400 forms an image on the sheet based on image data generated by the scanner 300 or image data received through a network. The printer 400 forms an image with the toner. The sheet on which the image is formed may be a sheet accommodated in the sheet accommodation unit 140 or a sheet that is manually fed. In the following description, "image being formed" will also be referred to as "image being printed".

The sheet accommodation unit 140 accommodates the sheet used for forming the image in the printer 400.

The scanner 300 reads an image to be read based on brightness and darkness of light. The scanner 300 records the read image data. The recorded image data may be transmitted to another information processing apparatus through a network. Based on the recorded image data, the printer 400 may form an image on the sheet.

Next, the description will be made mainly using FIG. 2. In FIG. 2, the image forming apparatus 1 includes the main control unit 100, the operation panel 200, the scanner 300, and the printer 400. The image forming apparatus 1 includes a main CPU 101 in main control unit 100, a panel CPU 201 in the operation panel 200, a scanner CPU 301 in the scanner 300, and a printer CPU 401 in the printer 400.

The main control unit 100 includes the main CPU 101, a ROM 102, a RAM 103, an NVRAM 104, a network controller 105, a HDD 106, a modem 107, a page memory 109, a page memory (PM) control unit 110, and an image processing unit 111.

The main CPU 101 controls an overall operation of the image forming apparatus 1. The ROM 102 stores data necessary for control, for example, a control program. The RAM 103 temporarily stores data. The NVRAM 104 is a nonvolatile memory.

The network controller 105 connects the image forming apparatus 1 and the network to each other. The image forming apparatus 1 communicates with an external apparatus such as a server or a personal computer (PC) through the network controller 105. The HDD 106 stores data of an image used for forming an image, an image read by the scanner 300, or the like. The HDD 106 is an example of a storage unit. In the image data stored in the HDD 106, a header of the image data read by the scanner 300 includes information representing a reading resolution during reading and a recorded resolution recorded in the HDD 106. The modem 107 connects the image forming apparatus 1 and a telephone line to each other.

The page memory 109 stores image data corresponding to a plurality of pages per page. The page memory control unit 110 controls the page memory 109. The image processing unit 111 executes image processing on image data. Specific examples of the image processing include color conversion processing, range correction processing, sharpness adjustment processing, gamma correction-halftone processing, and pulse width modulation (PWM) processing. The image processing unit 111 may be implemented using hardware such as an application specific integrated circuit (ASIC) or using software.

The operation panel 200 includes the panel CPU 201, the operation keys 202, and the display 203. The panel CPU 201 controls the operation panel 200. The panel CPU 201 is connected to the main CPU 101 via a bus. If an instruction is received regarding display from the main CPU, the panel CPU 201 controls a screen of the display 203 based on the received instruction. If a numerical value, processing to be executed, or a setting information is received from the operation keys 202, the panel CPU 201 outputs data representing the value, the processing, or the information to the main CPU 101. The operation keys 202 are an input apparatus for inputting the processing to be executed, the setting information, or the numerical value. In a specific example of the information received by the operation keys 202, various instructions or settings can be executed for a type (size and direction) of a sheet on which an image is to be formed, a magnification during image formation, or the like. The display 203 is a display apparatus such as a liquid crystal display or an organic EL display. The display 203 may be configured with a touch panel.

The scanner 300 includes the scanner CPU 301, an image correction unit 302, a reading control unit 303, a charged coupled device (CCD) 304, and an automatic document feeder (ADF) 305. The scanner CPU 301 controls the scanner 300. The image correction unit 302 includes, for example, an A/D converter circuit, a shading correction circuit, and a line memory. The A/D converter circuit converts each of analog signals of R, G, and B output from the CCD 304 into a digital signal. The ADF 305 is an automatic document conveying unit. The ADF 305 takes the sheet provided by the user into a conveyance path in a conveying direction corresponding to the direction in which the sheet is provided. The ADF 305 conveys the sheet by rotating a conveying roller in the conveyance path, and the CCD 304 reads an image on the conveyed sheet.

The printer 400 includes the printer CPU 401, a laser driver 402, a conveying controller 403, and a control unit 404. The printer CPU 401 controls the printer 400. The laser driver 402 drives a laser to form an electrostatic latent image on a photoreceptor. The conveying controller 403 conveys the sheet on which an image is to be formed. The control unit 404 forms an image on the sheet conveyed by the conveying controller 403 by controlling an apparatus such as the laser driver 402.

Figure 3:
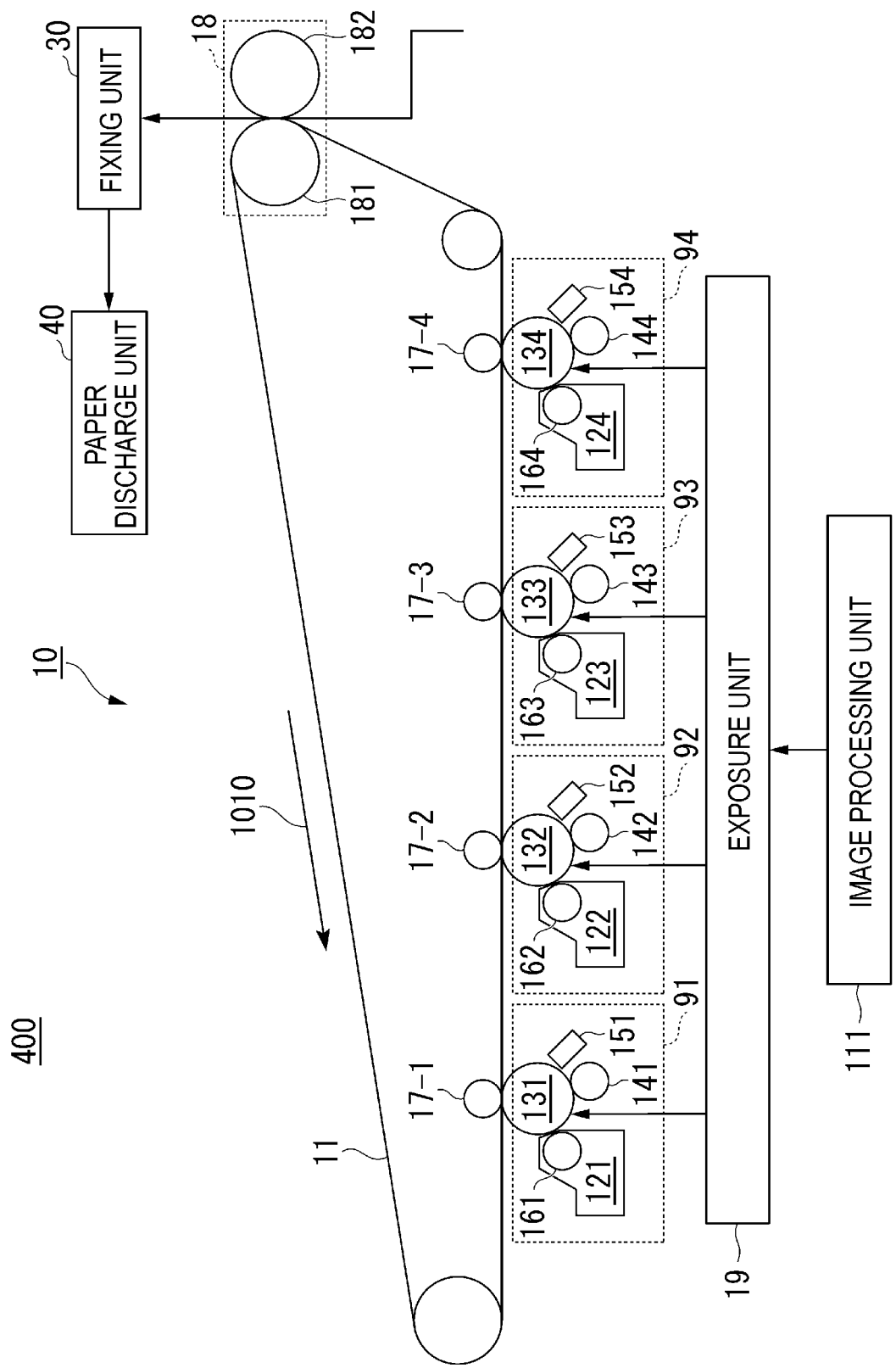
FIG. 3 is a diagram illustrating an example of an internal configuration of a printer.

FIG. 3 is a diagram illustrating an example of an internal configuration of the printer 400. In the example of FIG. 3, the printer 400 is a quadruple-tandem type printer. However, the printer 400 does not need to be limited to a quadruple-tandem type printer.

The printer 400 includes an image forming unit 10, a fixing unit 30, and a paper discharge unit 40. The image forming unit 10 includes an intermediate transfer medium 11, developing devices 91 to 94, a plurality of primary transfer rollers 17 (17-1 to 17-4), a secondary transfer unit 18, and an exposure unit 19.

The intermediate transfer medium 11 may be configured using, for example, an endless belt. The intermediate transfer medium 11 is rotated by a roller in a direction of an arrow 1010. In the embodiment, an upstream side and a downstream side are defined based on a direction in which the intermediate transfer medium 11 moves. Visible images generated by the developing devices 91 to 94 are transferred to a surface of the intermediate transfer medium 11.

The developing devices 91 to 94 form visible images using toners having different characteristics. For example, in some developing devices, toners having different colors may be used. As the toners having different colors, toners of respective colors including yellow (Y), magenta (M), cyan (C), and black (K) may be used. In some developing devices, a toner of which color is erased by an external stimulus (for example, heat) may be used. In some developing devices, a special toner such as a toner having glossiness or toner having fluorescence may be used.

In FIG. 3, the developing device 91 is positioned on the most upstream side among the four developing devices, and the developing device 94 is positioned on the most downstream side among the four developing devices.

The developing devices 91 to 94 have the same configuration although characteristics of the toner used in the developing devices 91 to 94 are different. The developing device 91 includes a developing unit 121, a photoconductive drum 131, a charging unit 141, a cleaning blade 151, and a developing drum 161. The developing device 92 includes a developing unit 122, a photoconductive drum 132, a charging unit 142, a cleaning blade 152, and a developing drum 162. The developing device 93 includes a developing unit 123, a photoconductive drum 133, a charging unit 143, a cleaning blade 153, and a developing drum 163. The developing device 94 includes a developing unit 124, a photoconductive drum 134, a charging unit 144, a cleaning blade 154, and a developing drum 164.

In the following description, the developing unit 121, the developing unit 122, the developing unit 123, and the developing unit 124 will be referred to as developing unit 12 unless they do not need to be distinguished from each other. The same can be applied to the photoconductive drums 13, the charging units 14, the cleaning blades 15, and the photoconductive drum 16.

Hereinafter, the developing device will be described using the developing device 91 as an example. The developing device 91 includes the developing unit 121, the photoconductive drum 131, the charging unit 141, the cleaning blade 151, and the developing drum 161. The developing unit 121 contains a toner and a carrier. The developing unit 121 attaches the toner to the photoconductive drum 131 using the developing drum 161.

The photoconductive drum 131 has a photoreceptor (photosensitive region) on an outer circumferential surface. The photoreceptor is, for example, an organic photoconductor (OPC). The photoconductive drum 131 is exposed to light by the exposure unit 19 to form an electrostatic latent image on a surface thereof.

The charging unit 141 uniformly charges the surface of the photoconductive drum 131.

The cleaning blade 151 is, for example, a member having a plate shape. The cleaning blade 151 is formed of, for example, rubber such as a urethane resin. The cleaning blade 151 removes toner attached to the photoconductive drum 131.

Next, the summary of the operation of the developing device 91 will be described. The photoconductive drum 131 is charged to a predetermined potential by the charging unit 141. Next, the photoconductive drum 131 is irradiated with light from the exposure unit 19. As a result, the potential of the region irradiated with light in the photoconductive drum 131 changes. Due to this change, an electrostatic latent image is formed on the surface of the photoconductive drum 131. The electrostatic latent image on the surface of the photoconductive drum 131 is developed with the toner of the developing unit 121. That is, a visible image as the image developed with the toner is formed on the surface of the photoconductive drum 131.

The primary transfer roller 17 (17-1 to 17-4) transfers the visible image that is formed on the photoconductive drum by each of the developing devices 91 to 94 to the intermediate transfer medium 11.

The secondary transfer unit 18 includes a secondary transfer roller 181 and a secondary transfer facing roller 182. The secondary transfer unit 18 collectively transfers the visible images formed on the intermediate transfer medium 11 to the sheet on which an image is to be formed. The transfer by the secondary transfer unit 18 is implemented, for example, by a potential difference between the secondary transfer roller 181 and the secondary transfer facing roller 182.

The exposure unit 19 irradiates the photoconductive drums of the developing devices 91 to 94 with light to form an electrostatic latent image. The exposure unit 19 includes a light source such as a laser or a light emitting diode (LED). In the embodiment, the exposure unit 19 includes a laser and operates under the control of the laser driver 402.

The fixing unit 30 applies heat and pressure to the visible image transferred to the sheet to fix the visible image to the sheet. The paper discharge unit 40 discharges the sheet on which the visible image is fixed by the fixing unit 30 to the outside of the image forming apparatus 1.

Next, a reading direction image representing a reading direction and an image forming direction image representing an image forming direction will be described. The reading direction image and the image forming direction image are images for a service person who executes an inspection or an investigation on the image forming apparatus to easily specify the reading direction and the image forming direction. If the reading direction or the image forming direction is specified, the time or troublesomeness required to investigate a malfunction of the image forming apparatus can be significantly reduced as compared to a case where the reading direction or the image forming direction is not specified.

First, the reading direction image will be described. The reading direction image is an image representing the reading direction in the scanner 300. The reading direction image may be an image representing the reading direction in the scanner 300, for example, depending on the position thereof. If a document is scanned, the image forming apparatus 1 synthesizes the reading direction image representing the reading direction of the scanner 300 with the image data. Specifically, the process will be as follows. The image processing unit 111 of the main control unit 100 synthesizes the reading direction image with the image data generated by scanning. The image processing unit 111 records the image data where the reading direction image is synthesized in the HDD 106.

The reading direction of the scanner 300 is a sub-scanning direction of a line sensor, and is a direction from a side that is finally read by the line sensor among four sides of the document to a side that is initially read by the line sensor among the four sides.

Figure 4:
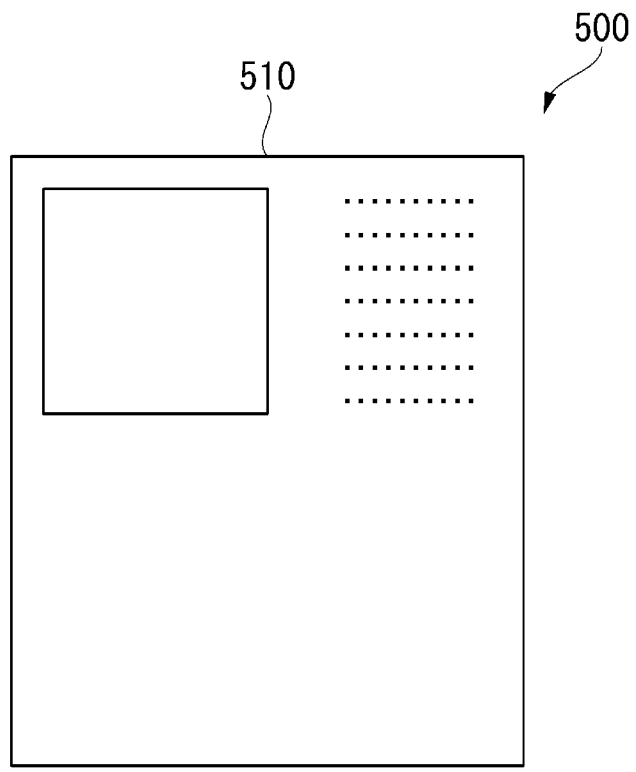
FIG. 4 is a diagram illustrating an example of a document.

Accordingly, the reading direction is uniquely determined, for example, if the side that is initially read is specified. Therefore, in the embodiment, the reading direction image is an image for specifying the side that is initially read by the line sensor among the four sides of the document. Specifically, the description will be made using the drawings. FIG. 4 is a diagram illustrating an example of the document. FIG. 4 illustrates a document 500. Among four sides of the document 500, a side that is initially read by the scanner 300 is represented by reference numeral 510.

Figure 5:
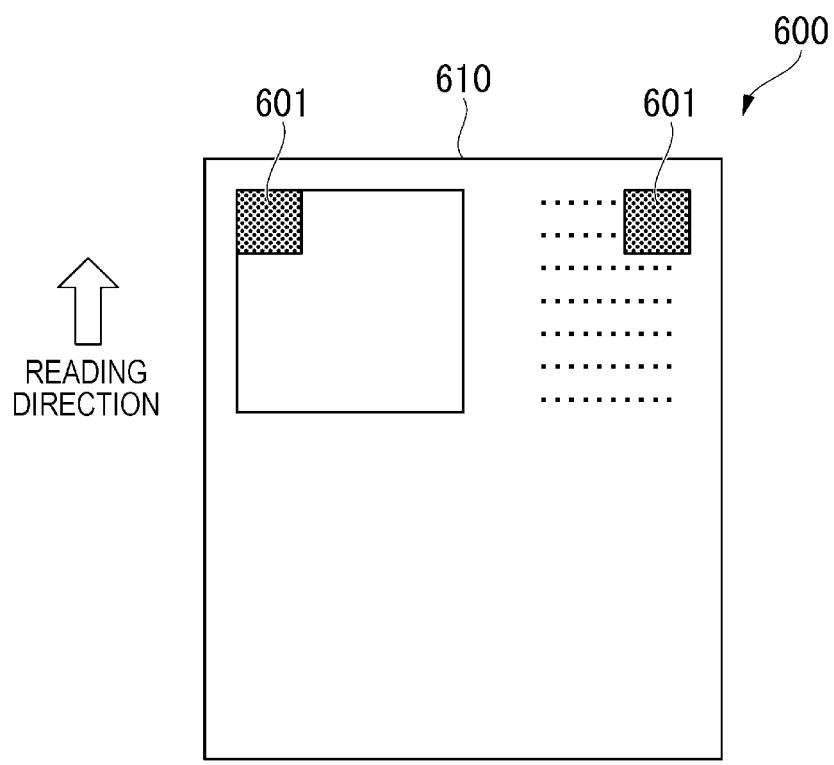
FIG. 5 is a diagram illustrating synthetic image data where a reading direction image is synthesized.

FIG. 5 is a diagram illustrating synthetic image data where the reading direction image is synthesized. A reading direction image 601 is synthesized with synthetic image data 600. The reading direction image is configured using one or more symbols. In the example of FIG. 5, two symbols (for example, a rectangular shape; more specifically, a square shape) are arranged in a direction perpendicular to the reading direction. If the reading direction can be determined, a specific shape or configuration of the reading direction image does not need to be limited. In the synthetic image data 600, a side corresponding to a side 510 of the document 500 is a side 610. This side 610 is specified by a reading direction image 601 configured by combining two symbols. As a result, the reading direction is easily specified.

The image data may be recorded in the HDD 106 at a resolution different from that if the document is read. For example, it is assumed that the resolution during the reading of the document is 600 dpi and the resolution of the image data that is recorded in the HDD 106 is 300 dpi. At this time, if the reading direction image is synthesized as it is, a part of the reading direction image may be missing.

Figure 6:
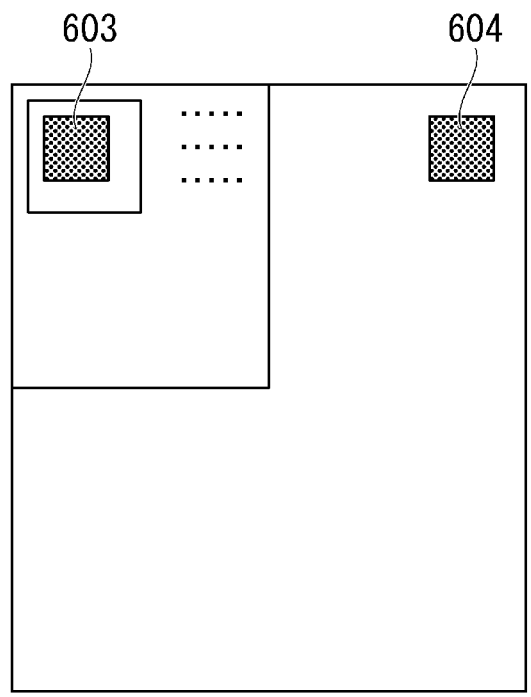
FIG. 6 is a diagram illustrating an example where the reading direction image is missing.

FIG. 6 is a diagram illustrating an example where the reading direction image is missing. Since the resolution is reduced, the image data that is recorded in the HDD 106 is data of an image at a reduced size. Therefore, as illustrated in FIG. 6, one symbol 603 configuring the reading direction image is synthesized, but another symbol 604 configuring the reading direction image is missing without being synthesized.

Therefore, the image processing unit 111 determines a position where the reading direction image is arranged and the size of the reading direction image based on the reading resolution and the recorded resolution such that a part of the reading direction image is not missing. Correction of the synthesis position and correction of the size of the reading direction image will be collectively referred to as "reading direction image correction process". Hereinafter, an example of the reading direction image correction process will be described.

First, it is assumed that, if the reading resolution and the recorded resolution are the same, coordinates of the synthesis position of each of the symbols of the reading direction image are represented by (XPOS1,YPOS1) and (XPOS2, YPOS2), respectively. It is assumed that the reading resolution is represented by IN_DPI and the recorded resolution is represented by OUT_DPI. It is assumed that a correction factor K is represented by OUT_DPI/IN_DPI. It is assumed that, if the reading resolution and the recorded resolution are the same, the lengths of the reading direction image in the horizontal direction and the vertical direction are represented by XSIZE and YSIZE, respectively.

At this time, the image processing unit 111 derives (K×XPOS1,K×YPOS1) and (K×XPOS2,K×YPOS2) as coordinates of the corrected synthesis position. The image processing unit 111 derives K×XSIZE and K×YSIZE as the corrected lengths of the corrected synthesis position of the reading direction image in the horizontal direction and the vertical direction, respectively. For example, if IN_DPI is 600 dpi and OUT_DPI is 300 dpi, the correction factor is 0.5. Therefore, the lengths of the symbol as the reading direction image in the horizontal and vertical directions are reduced to half.

Figure 7:
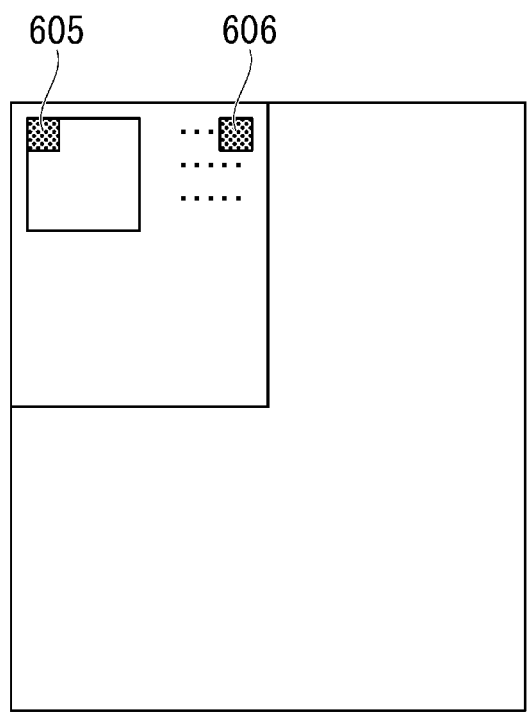
FIG. 7 is a diagram illustrating a synthesis example after correction.

FIG. 7 is a diagram illustrating a synthesis example after correction. As illustrated in FIG. 7, the sizes of both of a symbol 605 and a symbol 606 of the reading direction image are further corrected without missing. As a result, even if the reading resolution and the recorded resolution are different, the reading direction can be specified. If the image data is printed, the reading resolution returns to the original value to print the image data. Therefore, the size of the reading direction image is restored to the original size such that the reading direction image can be maintained at a certain size.

Next, the reading direction image during copying will be described. During copying, first, a document is read, a size change (enlargement or reduction) corresponding to a designated magnification is executed, and an image having the changed size is printed on a sheet having a designated size. If the position or the size of the reading direction image is changed due to the size change, there is a possibility that a service person cannot determine whether or not the image printed on the sheet is an image that is originally present in the document or the reading direction image. Whether or not to execute the size change or the magnification during the size change is recorded in the RAM 103. The image processing unit 111 determines whether or not to execute the size change by referring to the RAM 103.

Therefore, even if an image is formed on a sheet after changing the size of the image, the image processing unit 111 synthesizes the reading direction image with the image data without changing the synthesis position of the reading direction image and the size of the reading direction image.

Figure 8:
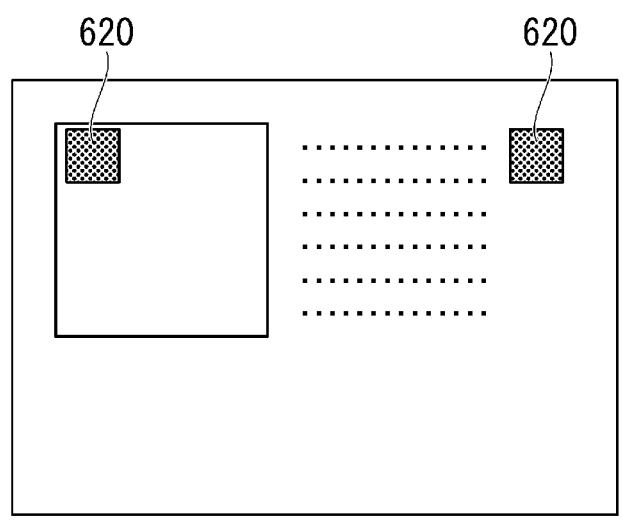
FIG. 8 is a diagram illustrating a sheet example where an image is printed at the same size.
Figure 9:
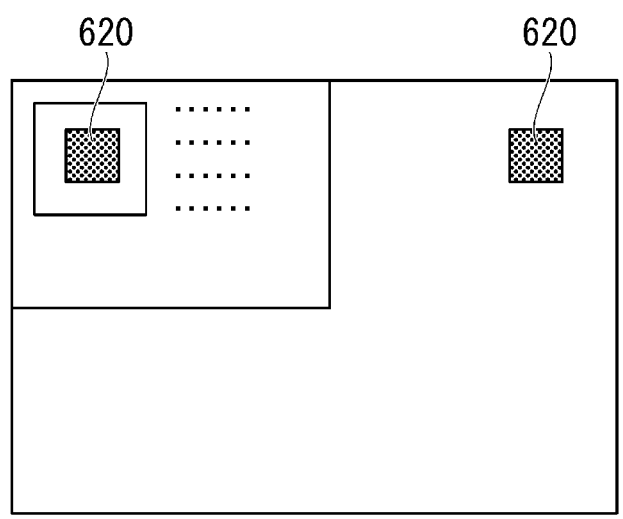
FIG. 9 is a diagram illustrating a sheet example where an image is printed at a reduced size.
Figure 10:
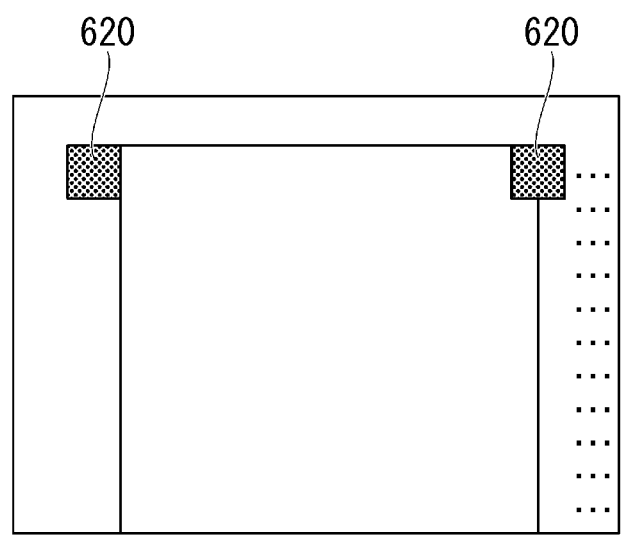
FIG. 10 is a diagram illustrating a sheet example where an image is printed at an enlarged size.

FIG. 8 is a diagram illustrating a sheet example where an image is printed at the same size. FIG. 9 is a diagram illustrating a sheet example where an image is printed at a reduced size. FIG. 10 is a diagram illustrating a sheet example where an image is printed at an enlarged size.

Even in each of FIGS. 8, 9, and 10, the image is printed without changing the synthesis position of each of symbols 620 of the reading direction image and the size of each of the symbols 620 of the reading direction image. As a result, a service person can determine whether or not the image printed on the sheet is an image that is originally present in the document or the reading direction image.

Next, the synthesis of the image forming direction image representing the image forming direction with the image data will be described. Here, the image forming direction is a conveying direction of a sheet that passes through the secondary transfer unit 18.

Accordingly, the image forming direction is uniquely determined, for example, if a side that initially passes through the secondary transfer unit 18 is specified. Therefore, in the embodiment, the image forming direction image is an image for specifying the side that initially passes through the secondary transfer unit 18 is specified among four sides of the sheet. The conveying direction of the sheet is determined based on the direction of the sheet in the sheet accommodation unit 140. Accordingly, the image processing unit 111 generates image data where the image forming direction image is synthesized based on the direction of the sheet in the sheet accommodation unit 140. The direction of the sheet is recorded in the RAM 103 for each cassette of the sheet accommodation unit 140. The image processing unit 111 records the synthesized image data in the HDD 106. The image data recorded in the HDD 106 is output to the printer 400.

Figure 11:
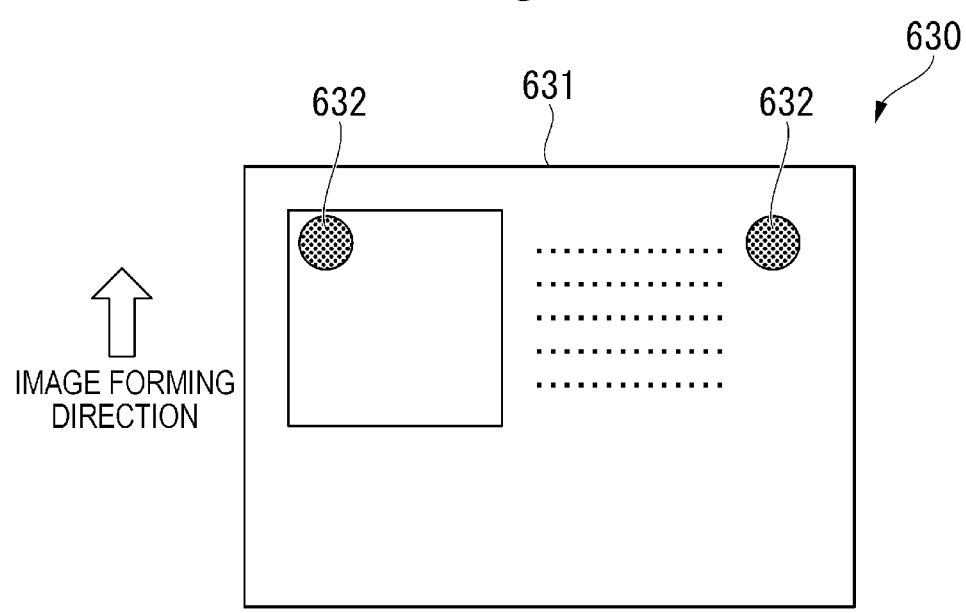
FIG. 11 is a diagram illustrating an example of a printed sheet where an image forming direction image is printed.

FIG. 11 is a diagram illustrating an example of a printed sheet where the image forming direction image is printed. FIG. 11 illustrates a printed sheet 630. The side that initially passes through the secondary transfer unit 18 among four sides of the printed sheet 630 is a side 631. This side 631 is specified by two image forming direction images 632 forming the image forming direction image. As a result, the image forming direction is easily specified.

As illustrated in FIG. 11, the image forming direction image 632 has a circular shape. That is, the reading direction image and the image forming direction image have different forms. In FIG. 11, the forms where the shapes are different are adopted. However, forms where the sizes, colors, densities, or patterns are different may be adopted. Even if an image is printed on a sheet after changing the size of the image, the image processing unit 111 synthesizes the image forming direction image with the image data without changing the size of the image forming direction image. As a result, a service person can determine whether or not the image printed on the sheet is an image that is originally present in the document or the image forming direction image.

Figure 12:
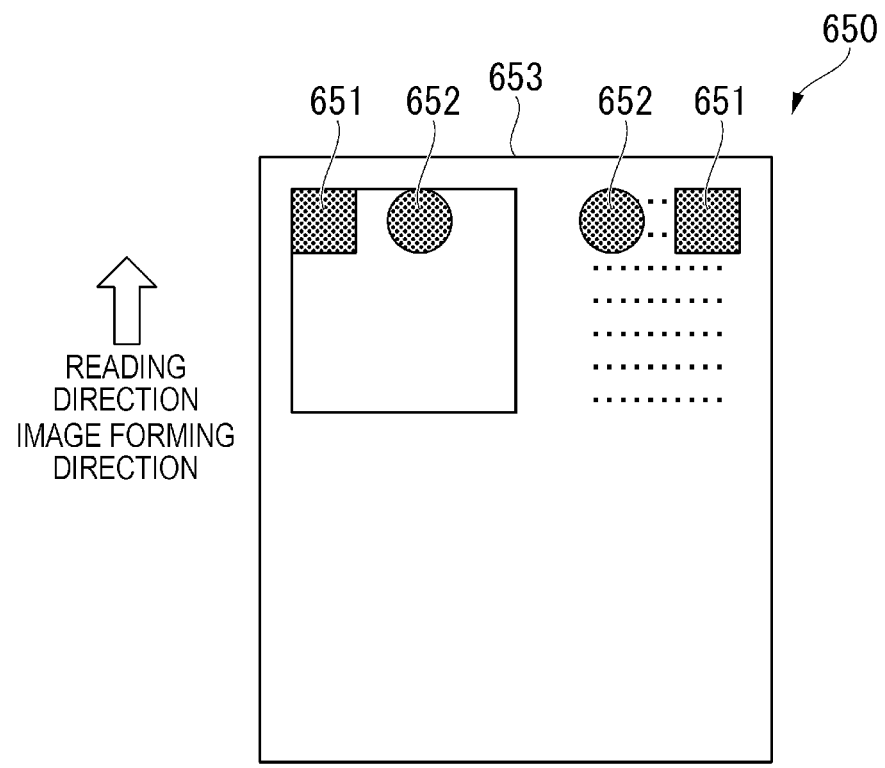
FIG. 12 is a diagram illustrating an example of a sheet where the image forming direction image and the reading direction image are printed.
Figure 13:
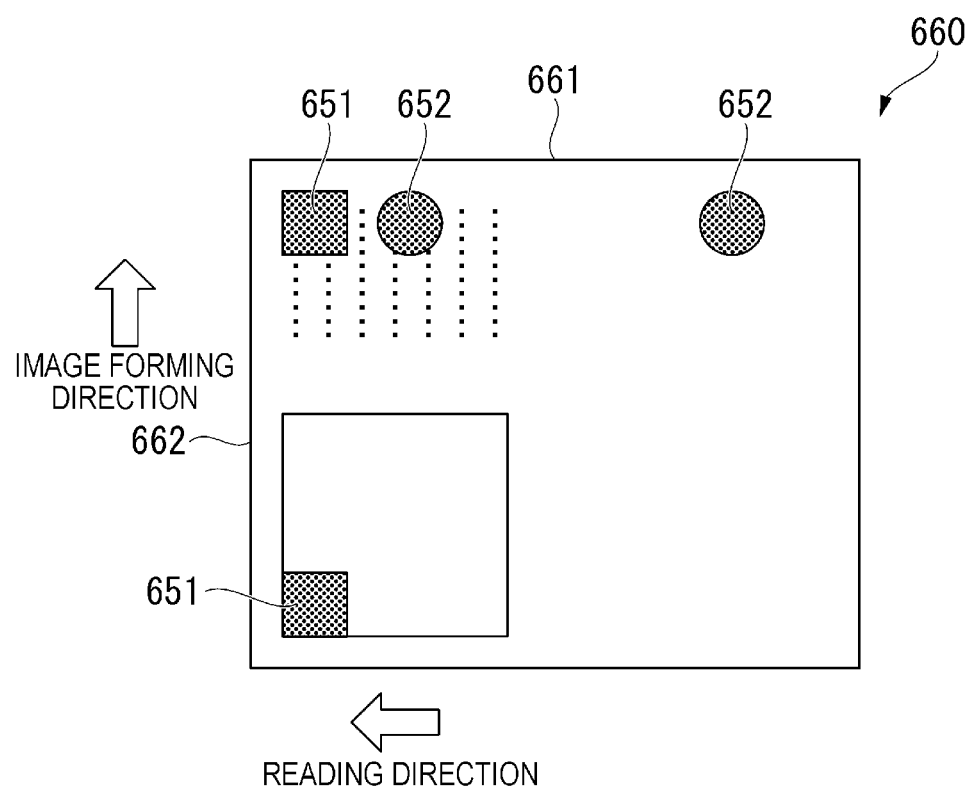
FIG. 13 is a diagram illustrating an example of a sheet where the image forming direction image and the reading direction image are printed.

The image forming apparatus 1 can also synthesize the image forming direction image and the reading direction image and print the synthesized image. FIGS. 12 and 13 are diagrams illustrating examples of sheets where the image forming direction image and the reading direction image are printed. In the examples illustrated in FIGS. 12 and 13, all of the sizes of the sheets 650 and 660 are A4. In the examples illustrated in FIGS. 12 and 13, the reading direction is a positive direction of A4. Here, the positive direction of A4 is a direction perpendicular to a short side of A4.

In the examples illustrated in FIGS. 12 and 13, the directions of the sheets in the sheet accommodation unit 140 are different by 90°. Specifically, in the example illustrated in FIG. 12, the direction of the sheet is set such that the conveying direction of the sheet is the positive direction of A4. In the example illustrated in FIG. 13, the direction of the sheet is set to (A4–R) such that the conveying direction of the sheet is perpendicular to the positive direction of A4.

Accordingly, in the example illustrated in FIG. 12, the reading direction and the image forming direction are the same. Therefore, a reading direction image 651 and an image forming direction image 652 are synthesized to have the same direction. On the other hand, in the example illustrated in FIG. 13, the reading direction and the image forming direction are different. Therefore, the reading direction image 651 and the image forming direction image 652 are synthesized to have different directions. In this way, the reading direction and the printing direction can be easily specified. Therefore, the time or troublesomeness required for a service person to investigate a malfunction can be significantly reduced.

As illustrated in FIGS. 12 and 13, the reading direction image 651 and the image forming direction image 652 are synthesized not to overlap each other. For example, the synthesis position of the image forming direction image is prepared in two patterns. One of the patterns represents the position if only the image forming direction image is synthesized. The other one of the patterns represents the positions if the reading direction image and the image forming direction image are synthesized simultaneously such that the image forming direction image does not overlap the reading direction image. As a result, the image processing unit 111 can synthesize the reading direction image and the image forming direction image not to overlap each other.

The process described above will be described using a flowchart. FIG. 14 is a flowchart illustrating the flow of a process of synthesizing a read image. The scanner 300 scans a document (ACT 101). Image data obtained by scanning is recorded in the page memory 109. The image processing unit 111 executes image processing on the image data recorded in the page memory 109 and records the processed image data in the HDD 106 (ACT 102).

The image processing unit 111 acquires the reading resolution and the recorded resolution from the image data recorded in the HDD 106 (ACT 103). The image processing unit 111 determines whether or not the acquired reading resolution is different from the recorded resolution (ACT 104). If the reading resolution and the recorded resolution are the same (ACT 104: NO), the image processing unit 111 proceeds to ACT 106. If the reading resolution and the recorded resolution are different (ACT 104: YES), the image processing unit 111 executes the above-described reading direction image correction process (ACT 105).

The image processing unit 111 synthesizes the reading direction image (ACT 106). Here, if the reading direction image correction process is executed, the image processing unit 111 synthesizes the reading direction image at a position or size derived in the reading direction image correction process. If the reading resolution and the recorded resolution are the same, the image processing unit 111 synthesizes the reading direction image at a position or size corresponding to the reading resolution. The image processing unit 111 records the synthesized image data in the HDD 106 (ACT 107) and ends the process.

FIG. 15 is a flowchart illustrating the flow of a process of synthesizing the reading direction image and the image forming direction image during copying. The scanner 300 scans a document (ACT 201). Image data obtained by scanning is recorded in the page memory 109. The image processing unit 111 executes image processing on the image data recorded in the page memory 109 and records the processed image data in the HDD 106 (ACT 202).

The image processing unit 111 determines whether or not to change the size of an image for copying (ACT 203). If the size of the image is not changed for copying (ACT 203: NO), the image processing unit 111 proceeds to ACT 205. If the size of the image is changed for copying (ACT 203: YES), the image processing unit 111 executes a size change process (ACT 204). The magnification to be changed or the like is recorded in the RAM 103 as described above. The image processing unit 111 synthesizes the reading direction image (ACT 205).

The image processing unit 111 acquires the direction of the sheet on which the image is to be formed in the sheet accommodation unit 140 (ACT 206). The image processing unit 111 synthesizes the image forming direction image based on the acquired direction (ACT 207). The image processing unit 111 records the synthesized image data in the HDD 106 (ACT 208). The image processing unit 111 converts the image data recorded in the HDD 106 into image data for printing (for example, raster data) and outputs the converted image data to the printer 400. The printer 400 prints an image using the input image data (ACT 209) and ends the process.

Next, an embodiment where encoded images are used as the reading direction image will be described. The encoded images include a first encoded image and a second encoded image. The first encoded image is an image representing encoded data where reading setting information used for the scanner 300 to read the image is encoded. The second encoded image is an image representing encoded data where forming setting information used for the printer 400 to form the image is encoded.

FIG. 16 is a diagram illustrating an example of the reading setting information. The reading setting information includes reading unit information, resolution information, reading mode information, and size information. For each of the information, a value representing the content of the information and the number of digits in the value are determined.

The reading unit information is information representing the unit that reads the document, and is represented by one-digit numerical value. In FIG. 16, the reading unit information represents which one of a document tray or the ADF 305 is used as the reading unit. If the document is placed on the document tray and read, the value is "0", and if the document is read by the ADF 305, the value is "1". In some ADF, two reading units (for example, a reading unit for a front surface and a reading unit for a back surface) may be provided. In this case, the reading unit information may be information for identifying the reading unit that reads the document.

The resolution information is information where the reading resolution is represented by X (dpi)×Y (dpi). Since each of X and Y is a three-digit numerical value, the resolution information is represented by a six-digit numerical value. The reading mode information is information representing whether the reading mode in which the document is read is monochrome, gray scale, or full color. If the reading mode is monochrome, the value is "0". If the reading mode is gray scale, the value is "1". If the reading mode is full color, the value is "2".

The size information is information representing the size of the document and the direction of the document, and is represented by a one-digit numerical value. If the direction of the document is determined depending on the size of the document, the size information represents only the size of the document. If the size and the direction of the document are A4 horizontal, the value is "0". If the size and the direction of the document are A4 vertical, the value is "1". If the size of the document is A3, the value is "2". If the size of the document is B4, the value is "3".

For example, if the ADF 305 is used, the resolution is 300 (dpi)×300 (dpi), the reading mode is full color, and the size and the direction are A4 vertical during reading, the reading setting information is represented by "130030021". The image where the numerical value is encoded is the first encoded image.

FIG. 17 is a diagram illustrating an example of the forming setting information. The forming setting information includes rotation information, printing mode information, size change information, integration information, and size information. For each of the information, a value representing the content of the information and the number of digits in the value are determined.

The rotation information is information representing whether or not the image representing the read document is rotated to form an image, and is represented by a one-digit numerical value. If the image representing the read document is not rotated, the value is "0". If the image representing the read document is rotated, the value is "1".

The printing mode information is information representing whether the printing mode in which the image is to be printed is a character mode or a picture mode, and is represented by a one-digit numerical value. In this way, the image forming apparatus 1 can execute image processing corresponding to the type (characters or a picture) of the image drawn on the document. This image processing is executed, for example, by the image processing unit 111.

The character mode is a mode in which image processing suitable for a case where the type of the image drawn on the document is characters is executed. The image processing that is executed in the character mode is, for example, a filter process of preventing characters from being blurred or a process of erasing a low density image such as a background image to increase the density of characters. The picture mode is a mode in which image processing suitable for a case where the type of the image drawn on the document is a picture is executed. The image processing that is executed in the picture mode is a process of decreasing the density of a low density region and increasing the density of a high density region for gradation. If the printing mode is the character mode, the value is "0". If the printing mode is the picture mode, the value is "1".

The size change information is information representing a magnification where the size of the document is changed to the size of a sheet on which an image is to be formed, and is represented by a three-digit numerical value. In the embodiment, the magnification is 25(%) to 400(%), and the magnification itself is the value. The number of pages integrated is information representing the number of pages integrated into one page, and is represented by a one-digit numerical value. In the embodiment, the number of pages integrated is 1 (page) to 8 (pages), and the number of pages integrated itself is the value.

The size information is information representing the size of the sheet on which the image is to be formed and the direction of the sheet, and is represented by a one-digit value. If the direction of the sheet is determined depending on the size of the sheet, the size information represents only the size of the sheet. If the size and the direction of the sheet are A4 horizontal, the value is "0". If the size and the direction of the sheet are A4 vertical, the value is "1". If the size of the sheet is A3, the value is "2". If the size of the sheet is B4, the value is "3".

For example, it is assumed that the image representing the read document is rotated, the printing mode is the picture mode, the magnification is 100 (times), the number of pages integrated is 1 (page), and the size and the direction are A4 vertical to form the image. In this case, the forming setting information is represented by "1110011". The image where the numerical value is encoded is the second encoded image.

The reading setting information and the forming setting information described above are merely examples and are not limited to the information illustrated in FIGS. 16 and 17, respectively.

Next, an example of the encoded image will be described. In the embodiment, as an example of the encoded image, a two-dimensional code or a barcode is used. FIG. 18 is a diagram illustrating an example of the two-dimensional code. FIG. 19 is a diagram illustrating an example of the barcode. In general, the two-dimensional code can represent a large amount of information. Therefore, depending on the amount of information to be encoded, the barcode and the two-dimensional code are selectively used.

Figure 20:
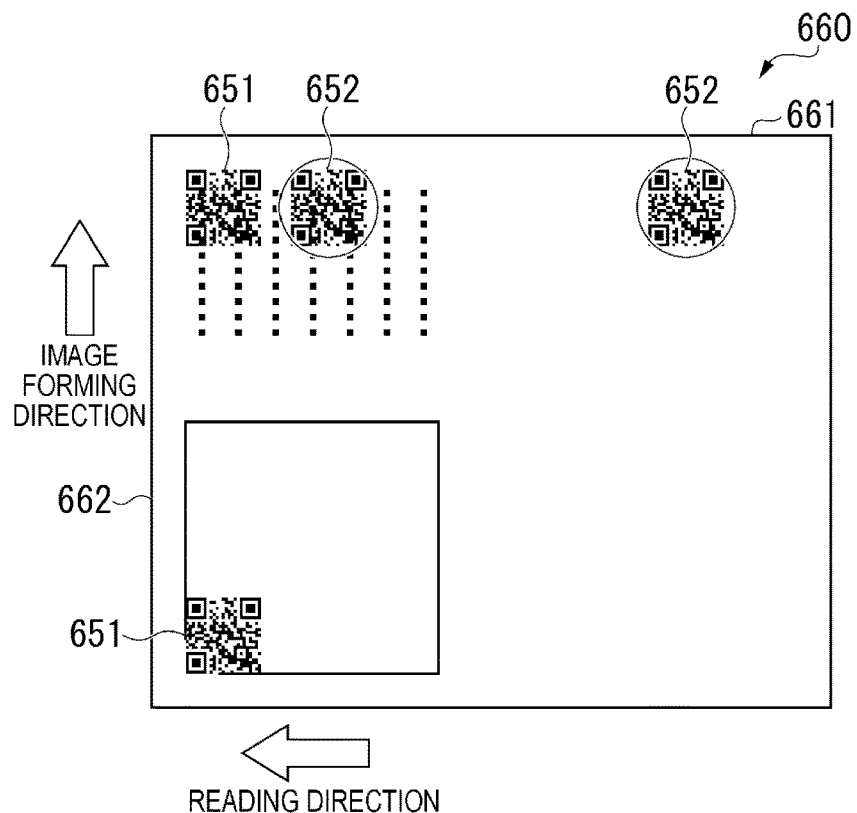
FIG. 20 is a diagram illustrating a sheet example where an image is printed using the two-dimensional code.

FIG. 20 is a diagram illustrating a sheet example where an image is printed using the two-dimensional codes as the image forming direction image and the reading direction image. In the sheet example illustrated in FIG. 20, the document is read from a left end to a right end of a sheet 660, and the image is printed from an upper end to a lower end of the sheet 660.

The reading direction image 651 and the image forming direction image 652 are shown on the sheet 660. Since both of the reading direction image 651 and the image forming direction image 652 are the two-dimensional codes, the image forming direction image 652 is printed in a form where it is surrounded by a circle.

Figure 21:
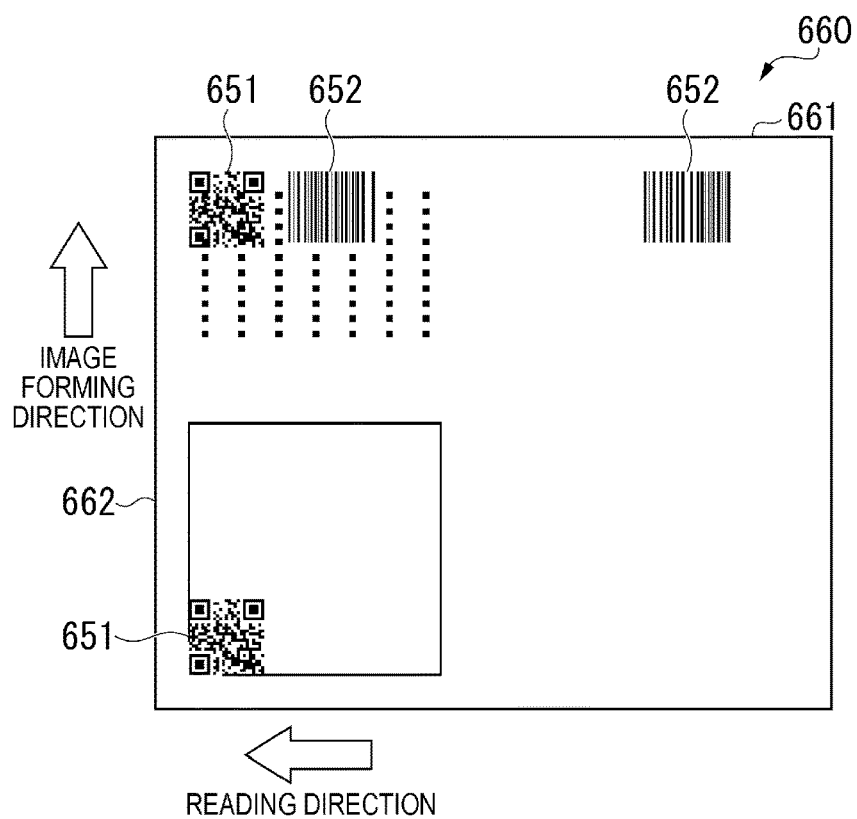
FIG. 21 is a diagram illustrating a sheet example where an image is printed using different types of encoded images.

As illustrated in FIG. 20, the same type of encoded images may be used as the reading direction image and the image forming direction image. However, different types of encoded images may also be used. FIG. 21 is a diagram illustrating a sheet example where an image is printed using different types of encoded images. In FIG. 21, the reading direction image 651 is the two-dimensional code, and the image forming direction image 652 is the barcode. As a result, the encoded image does not need to be surrounded by a circle as in FIG. 20 and can also be easily distinguished by visual inspection.

Next, an embodiment where the direction of the encoded image is used will be described. The two-dimensional code illustrated in FIG. 22 includes finder patterns 701, 702, and 703 for representing the direction. The reading direction and the image forming direction are represented using the finder patterns 701, 702, and 703.

Figure 22:
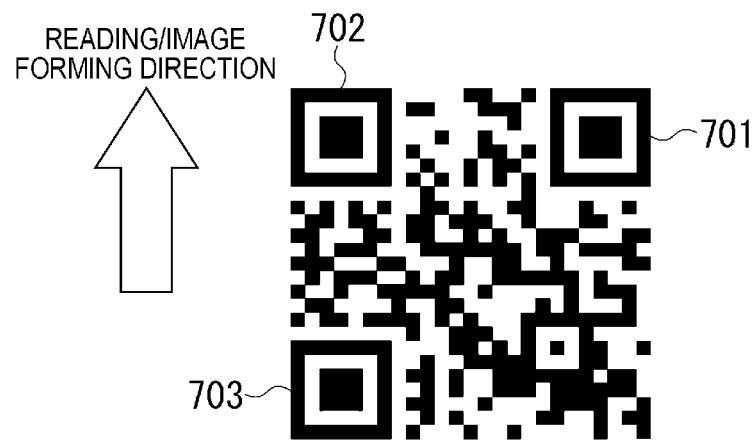
FIG. 22 is a diagram illustrating a direction of an encoded image.

For example, as illustrated in FIG. 22, a direction from the finder pattern 703 to the finder pattern 702 is predetermined as the reading direction or the image forming direction. As a result, the direction can be represented by one encoded image.

Figure 23:
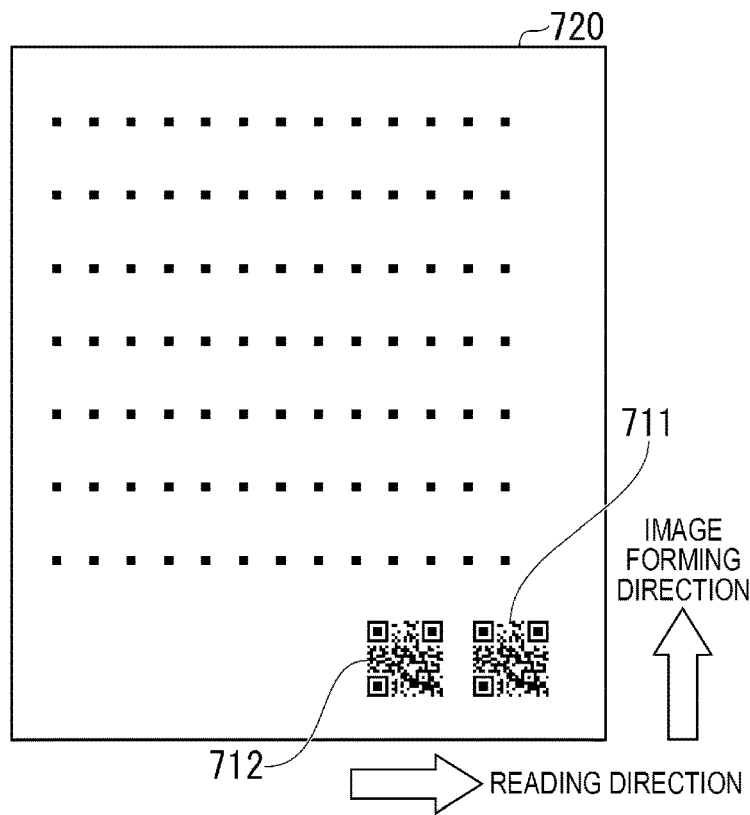
FIG. 23 is a diagram illustrating a sheet where the reading direction and the image forming direction are represented by two encoded images.

FIG. 23 is a diagram illustrating a sheet 720 where the reading direction and the image forming direction are represented by two encoded images. An encoded image 711 represents the image forming direction. An encoded image 712 positioned on the left side represents the reading direction. It can be seen from the encoded image 711 that a direction from a lower end to an upper end of the sheet 720 is the image forming direction. It can be seen from the encoded image 712 positioned on the right side that a direction from a left end to a right end of the sheet 720 is the reading direction.

In the examples of FIGS. 12 and 13, two images are required as each of the reading direction image 651 and the image forming direction image 652, and the directions are represented by the positions. Therefore, the degree of freedom of the synthesis positions is small. Accordingly, as illustrated in FIG. 12, there is a case where the reading direction image or the image forming direction image is synthesized with the original image.

On the other hand, by using the encoded images that can represent the direction, only one image is required as each of the reading direction image and the image forming direction image, and the directions do not need to be represented by the positions. As a result, as in the sheet 720 shown in FIG. 23, the reading direction image and the image forming direction image can be synthesized in the margin of the sheet.

Figure 24:
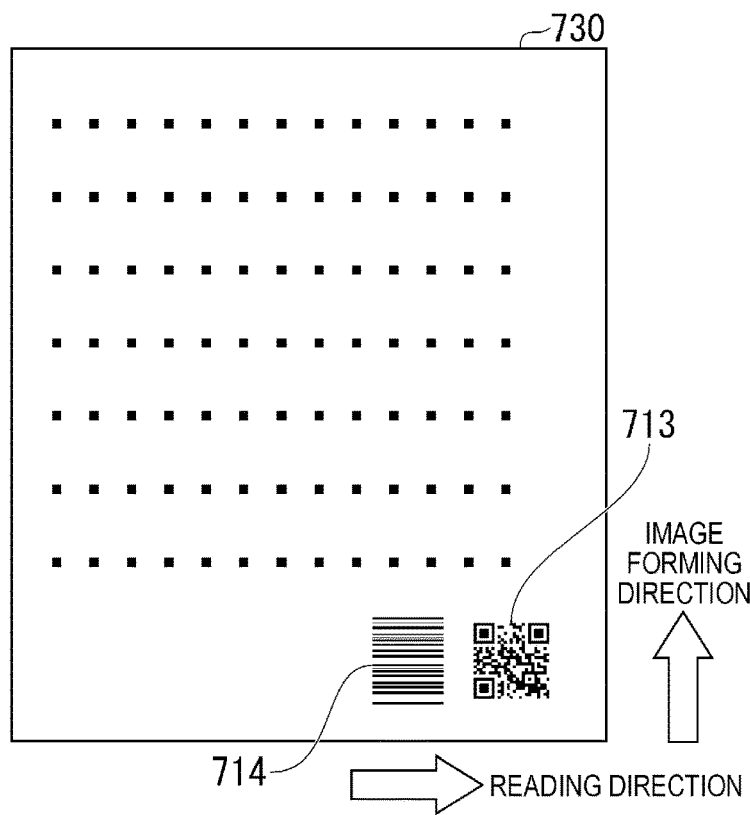
FIG. 24 is a diagram illustrating a sheet 730 where the reading direction is represented by a barcode and the image forming direction is represented by a two-dimensional code.

Even in the barcode, the patterns for identifying both of right and left ends are drawn. Therefore, the direction can be represented by one barcode as in the two-dimensional code. FIG. 24 is a diagram illustrating a sheet 730 where the reading direction is represented by the barcode and the image forming direction is represented by the two-dimensional code.

If the reading direction and the image forming direction are represented by different types of encoded images as described above, one type of encoded image is assigned to the reading direction, and another different type of encoded image is assigned to the image forming direction. As a result, unlike FIG. 23, the direction does not need to be determined in advance depending on the position of the encoded image.

In the embodiments described above, the reading setting information and the forming setting information are encoded. Information that can specify the reading setting information or the forming setting information may be encoded. As the information that can specify the reading setting information or the forming setting information, for example, the image forming apparatus 1 stores the reading setting information or the forming setting information in correlation with a job ID, a process number, or the like that is uniquely assigned to the reading process or the image forming process, for example, in the HDD 106. The job ID or the process number is the information that can specify the reading setting information or the forming setting information. That is, the job ID or the process number is encoded. Even in this case, the reading setting information or the forming setting information can be obtained.

In the embodiments, by synthesizing the encoded images where the reading setting information and the forming setting information are encoded, information for an investigation is not missing, or, wrong information is prevented from being provided. Therefore, the reason for the missing or wrong information is easily specified. In addition, the image forming apparatus 1 prints the encoded images.

Therefore, there is no load on a service person, and accurate information can be obtained. In the embodiments, accurate information regarding the reading or printing of a document can be easily acquired.

Further, the reading direction and the image forming direction are represented by the positions and the directions of the encoded images. Therefore, the information representing the reading direction and the image forming direction does not need to be encoded, and the reading setting information and the forming setting information may be encoded as described above.

In addition, plural types of two-dimensional codes are present. The two-dimensional code may be any type as long as it can encode the reading setting information or the forming setting information. Likewise, plural types of barcodes are present. The barcode may be any type as long as it can encode the reading setting information or the forming setting information.

In the embodiments described above, the process of reading a document and printing the image is described. However, even in a process of reading a document and transmitting the image data through a facsimile machine, the reading setting information can be synthesized. Accordingly, the embodiments are applicable to the process of transmitting the image data through the facsimile machine.

In the embodiment, the main CPU 101 and the image processing unit 111 may be implemented by the same processor.

With the image forming apparatus 1 according to the embodiment, an image forming apparatus where the reading direction can be easily specified can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
an image reading component configured to read an image on a document;
an image forming component configured to form an image on a sheet; and
a controller configured to generate, if the image read by the image reading component is formed by the image forming component, a first encoded image and a second encoded image and to synthesize the first encoded image and the second encoded image with the image formed by the image forming component to generate a synthetic image, the first encoded image representing encoded data where reading setting information used for the image reading component to read the image is encoded, the second encoded image representing encoded data where forming setting information used for the image forming component to form the image is encoded, the first encoded image being synthesized at a position where a direction in which the document is read by the image reading component is specifiable, and the second encoded image being synthesized at a position where a direction in which the image is formed on the sheet is specifiable, wherein the image forming component forms the synthetic image on the sheet.

2. The image forming apparatus according to claim 1, wherein the first encoded image or the second encoded image is a barcode or a two-dimensional code.

3. The image forming apparatus according to claim 1, wherein the image reading component includes an automatic document feeder, and
the reading setting information includes information representing whether or not an image is read by the automatic document feeder.

4. The image forming apparatus according to claim 1, wherein the controller is configured to execute image processing on the image obtained by the image reading component reading the image depending on a type of the image on the document, and
the reading setting information includes information representing the image processing that is executed on the image.

5. The image forming apparatus according to claim 1, wherein the first encoded image and the second encoded image are different types of encoded images.

6. An image forming apparatus, comprising:
an image reading component configured to read an image on a document;
an image forming component configured to form an image on a sheet; and
a controller configured to generate, if the image read by the image reading component is formed by the image forming component, a first encoded image and a second encoded image and to synthesize the first encoded image and the second encoded image with the image formed by the image forming component to generate a synthetic image, the first encoded image representing encoded data where reading setting information used for the image reading component to read the image is encoded, and the second encoded image representing encoded data where forming setting information used for the image forming component to form the image is encoded,
wherein the first encoded image is an image representing a direction in which the document is read by the image reading unit, the second encoded image is an image representing a direction in which the image is formed on the sheet, and
the image forming component forms the synthetic image on the sheet.

7. The image forming apparatus according to claim 6, wherein the first encoded image or the second encoded image is a barcode or a two-dimensional code.

8. The image forming apparatus according to claim 6, wherein the image reading component includes an automatic document feeder, and
the reading setting information includes information representing whether or not an image is read by the automatic document feeder.

9. The image forming apparatus according to claim 6, wherein the controller is capable of executing image processing on the image obtained by the image reading component reading the image depending on a type of the image on the document, and
the reading setting information includes information representing the image processing that is executed on the image.

10. The image forming apparatus according to claim 6, wherein the first encoded image and the second encoded image are different types of encoded images.

11. An image forming method, comprising:
reading an image on a document by an image reading component;
forming an image on a sheet by an image forming component;
generating, if the image read by the image reading component is formed by the image forming component, a first encoded image and a second encoded image and synthesizing the first encoded image and the second encoded image with the image formed by the image forming component to generate a synthetic image, the first encoded image representing encoded data where reading setting information used for the image reading component to read the image is encoded, the second encoded image representing encoded data where forming setting information used for the image forming component to form the image is encoded, the first encoded image being synthesized at a position where a direction in which the document is read by the image reading component is specifiable, and the second encoded image being synthesized at a position where a direction in which the image is formed on the sheet is specifiable; and
forming the synthetic image on the sheet by the image forming component.

12. The image forming method according to claim 11, wherein the first encoded image or the second encoded image is a barcode or a two-dimensional code.

13. The image forming method according to claim 11, wherein the image reading component includes an automatic document feeder, and
the reading setting information includes information representing whether or not an image is read by the automatic document feeder.

14. The image forming method according to claim 11, further comprising:
executing image processing on the image obtained by the image reading component reading the image depending on a type of the image on the document, and wherein
the reading setting information includes information representing the image processing that is executed on the image.

15. The image forming method according to claim 11, wherein the first encoded image and the second encoded image are different types of encoded images.

16. An image forming method, comprising:
reading an image on a document by an image reading component;
forming an image on a sheet by an image forming component;
generating, if the image read by the image reading component is formed by the image forming component, a first encoded image and a second encoded image and synthesizing the first encoded image and the second encoded image with the image formed by the image forming component to generate a synthetic image, the first encoded image representing encoded data where reading setting information used for the image reading component to read the image is encoded, and the second encoded image representing encoded data where forming setting information used for the image forming component to form the image is encoded;
wherein the first encoded image is an image representing a direction in which the document is read by the image reading unit, the second encoded image is an image representing a direction in which the image is formed on the sheet; and forming the synthetic image on the sheet by the image forming component.

17. The image forming method according to claim 16, wherein the first encoded image or the second encoded image is a barcode or a two-dimensional code.

18. The image forming method according to claim 16, wherein the image reading component includes an automatic document feeder, and the reading setting information includes information representing whether or not an image is read by the automatic document feeder.

19. The image forming method according to claim 16, further comprising:

executing image processing on the image obtained by the image reading component reading the image depending on a type of the image on the document, and wherein the reading setting information includes information representing the image processing that is executed on the image.

20. The image forming method according to claim 16, wherein the first encoded image and the second encoded image are different types of encoded images.

* * * * *